(12) United States Patent
Johnston

(10) Patent No.: US 6,480,585 B1
(45) Date of Patent: Nov. 12, 2002

(54) SYSTEM AND METHOD FOR TRANSMITTING A FACSIMILE VIA A NETWORK

(75) Inventor: James W. Johnston, Rancho Santa Marguarita, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/784,569

(22) Filed: Feb. 15, 2001

(51) Int. Cl.[7] .............................................. H04M 11/00
(52) U.S. Cl. ............................ 379/100.17; 379/100.01; 358/434
(58) Field of Search ....................... 379/100.01, 100.17, 379/90.01, 93.05; 375/377, 222, 242; 370/352, 353, 356; 358/400, 434, 464

(56) References Cited

U.S. PATENT DOCUMENTS 6,151,364 A1 * 11/2001 Ruether et al. ............. 375/254
6,335,803 B1 *  1/2002 Chimura et al. ........... 358/334

OTHER PUBLICATIONS

Gross et al.; Spliterless Multicarrier Modem; WO 99/20027.*

Williams, Richard, "Enhancements to Recommendation V. 90," International Telecommunications Union, Revision Date: Feb. 15, 2000.

Williams, Richard, "A Digital Modem and Analogue Modern Pair for Use on the Public Switched Telephone Network (PSTN) at Data Signalling Rates Up to 56000 Bit/s Down Stream and Up to 33600 Bit/s Upstream," Draft Recommendation V. 90, International Telecommunications Union, Revision Date: May 6, 1998.

International Telecommunication Union, *ITU–T Reccomendation T.38*, "Series T: Terminals For Telematic Services–Procedures for Real–Time Group 3 Facsimile Communication Over IP Networks," Jun., 1998.

International Telecommunication Union, *ITU–T Recommendation T.30*, "Series T: Terminal Equipments and Protocols For Telematic Services–Procedures for Document Facsimile Transmission in the General Switched Telephone Network," Jul., 1996.

* cited by examiner

Primary Examiner—Melur Ramakrishnaiah
(74) Attorney, Agent, or Firm—Michael J. D'Aurelio

(57) ABSTRACT

A data communications system and method are provided, for example, in a facsimile machine to establish a data link with a gateway over a local loop. The data link is established employing pulse code modulation with prioritization in the upstream direction. Alternatively, a modulation type may be employed that is equivalent to pulse code modulation that provides similar or higher speed data communication. By using pulse code modulation in the upstream direction, the resulting facsimile transmission in accomplished with much greater speed.

18 Claims, 5 Drawing Sheets

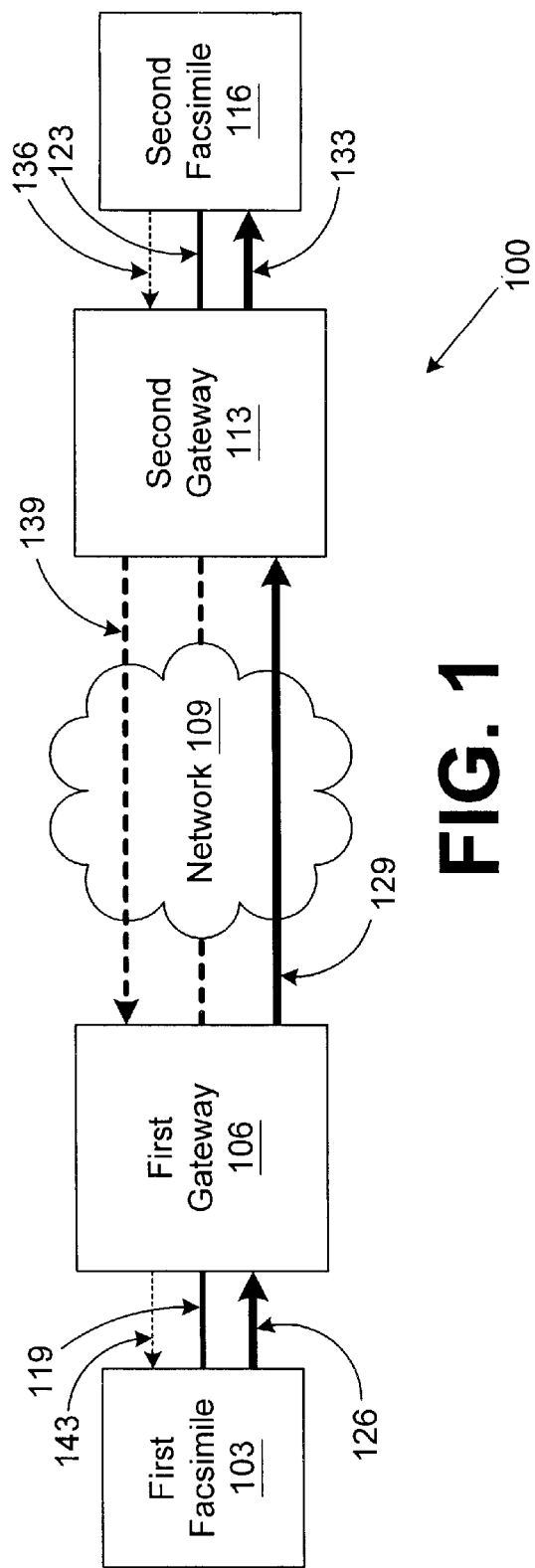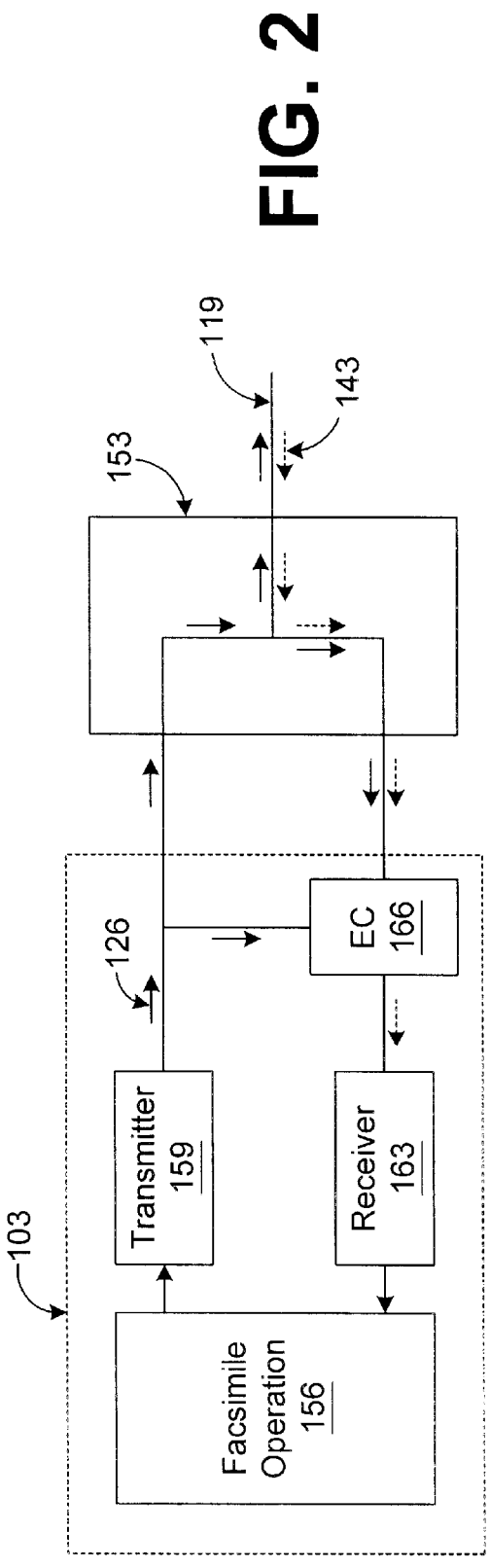

SYSTEM AND METHOD FOR TRANSMITTING A FACSIMILE VIA A NETWORK

TECHNICAL FIELD

The present invention is generally related to the field of data communications and, more particularly, is related to a system and method for transmitting a facsimile via a network.

BACKGROUND OF THE INVENTION

The use of facsimile machines that link up with each other by way of the public switched telephone network (PSTN) has become wide spread around the world. Data transmission by facsimile is generally asymmetric in that most of the data transfer flows in one direction, namely, from the transmitting facsimile to the receiving facsimile. Transmission in the reverse direction is minimal and generally encompasses acknowledgement signals from the receiving facsimile to the transmitting facsimile. One common problem with transmission by facsimile using the PSTN is that it often requires long distance telephone calls between facsimile machines.

With the onset of the Internet, new modes of data transfer are possible that eliminate the problem of long distance telephone calls. Specifically, current efforts have been undertaken to allow facsimile machines to use the Internet to transfer data where the respective facsimile machines link up locally to the Internet using the PSTN. For example, a calling facsimile machine contacts a first gateway via a local call over the PSTN. The first gateway then communicates with a second gateway over the Internet. The second gateway the contacts the receiving facsimile machine via a local call over the PSTN. Essentially, the Internet is used as a tool to avoid long distance communication between facsimile machines. Such data transfer is often referred to as "Faxover Internet Protocol" or "Faxover IP".

Unfortunately, the Internet is capable of transmitting data much faster than the data communication that takes place between the facsimile machines and their respective gateways over the public switched telephone network. In a sense, the facsimile machines become a bottleneck that significantly reduces the speed at which a facsimile is transferred using Faxover IP approaches.

SUMMARY OF THE INVENTION

In light of the foregoing, the present invention provides for a data communications system and method in a facsimile machine to establish a data link with a gateway over a local loop. The data link is established employing pulse code modulation with prioritization in the upstream direction. Alternatively, a modulation type may be employed that is equivalent to pulse code modulation that provides similar or higher speed data communication. By using pulse code modulation in the upstream direction, the resulting facsimile transmission in accomplished with much greater speed.

In one embodiment, the present system may include, for example, a processor circuit having a processor and a memory that are coupled to a local interface such as, for example, a data bus with an accompanying control bus. Also, the system includes data communications logic stored on the memory and executable by the processor. To begin, the data communications logic is executed, for example, to set-up a virtual data communications link with a peer facsimile machine through a first public switched telephone network (PSTN) link, a network, and a second PSTN link. Once the virtual data communications link is established, then a data rate is negotiated with the peer facsimile. The negotiations performed determine whether the peer facsimile is capable of employing pulse code modulation or its equivalent. Finally, a facsimile transmission is performed in which the upstream data signal in the first PSTN link is sent using a pulse code modulation.

The present system may also be viewed as a method for data communication in a facsimile machine. In this regard, the method includes the steps of: setting up a virtual data communications link with a peer facsimile machine through a first public switched telephone network (PSTN) link, a network, and a second PSTN link; negotiating a data rate with the peer facsimile; and transmitting an upstream data signal in the first PSTN link using a pulse code modulation.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 1 is a block diagram of a facsimile transmission using a data communications network according to an embodiment of the present invention;

FIG. 2 is a function block diagram of a first facsimile in the data communications network of FIG. 1;

DETAILED DESCRIPTION OF THE INVENTION

Figure 3:
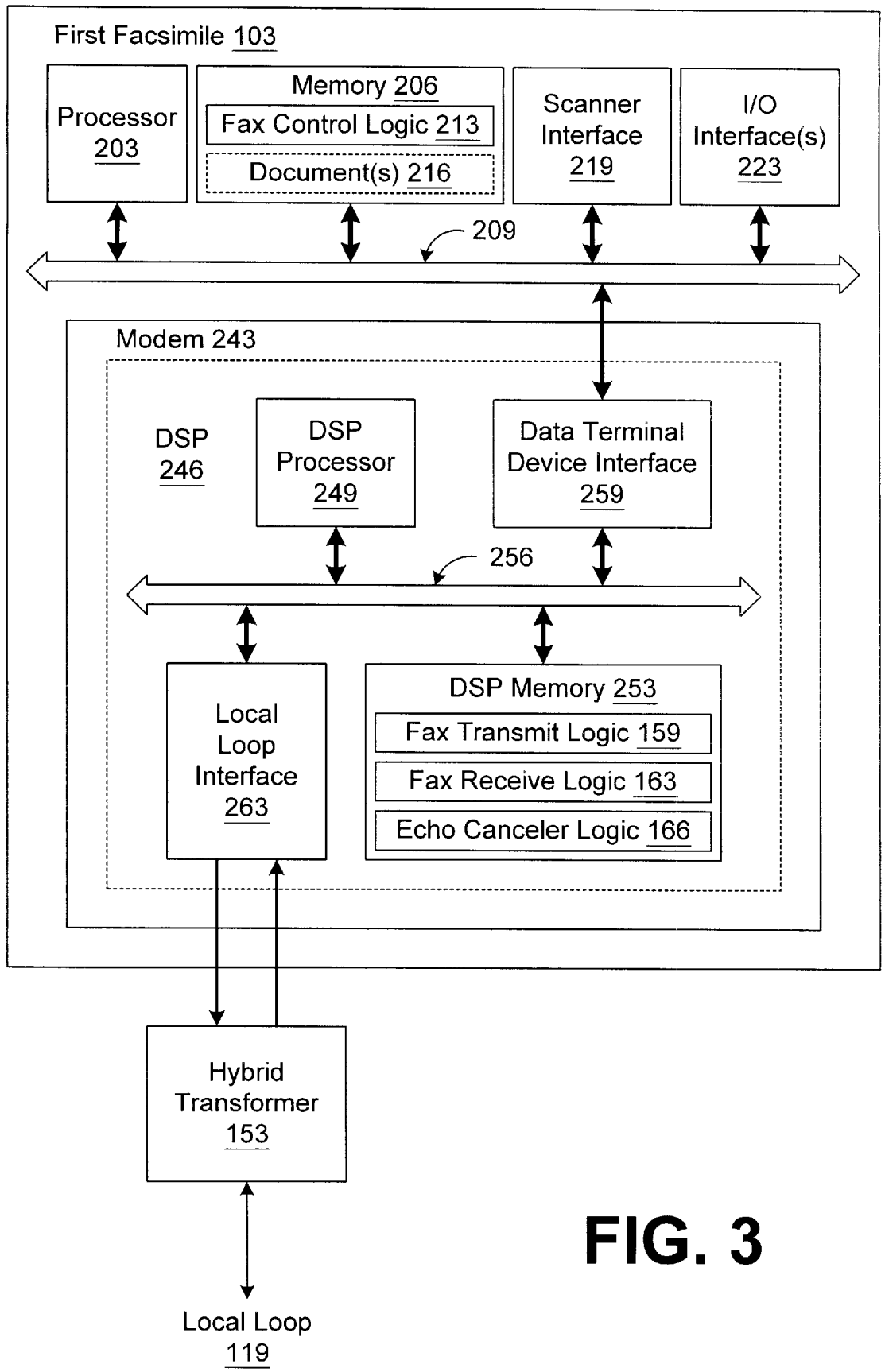
FIG. 3 is a block diagram of the first facsimile of FIG. 1.

Turning to FIG. 1, shown is a data communications network 100 according to an embodiment of the present invention. The data communications network 100 includes a first facsimile 103, a first gateway 106, a network 109, a second gateway 113, and a second facsimile 116. The first facsimile 103 is coupled to the first gateway 106, for example, by way of a local loop 119 of the public switched telephone network (PSTN). Likewise, the second gateway 113 is coupled to the second facsimile 116, for example, by way of a local loop 123. The first and second gateways 106 and 113 are coupled to each other through the network 109 as shown. The network 109 may be, for example, the Internet or other such network as well as a combination of two or more such networks.

During operation, for example, the first facsimile 103 calls the first gateway 106 by way of the local loop 119 to establish a data link with the second facsimile 116. The first gateway 106 then contacts the second gateway 113 by way of the network 109. Finally, the second gateway 113 contacts the second facsimile 116 through the local loop 123 to complete the data link between the first facsimile 103 and the second facsimile 116.

Once the data communications link is established between the first facsimile 103 and the second facsimile 116, the first and second facsimiles 103 and 116 negotiate the data rate and other characteristics of the fax transmission that is to follow. The fax transmission from the first facsimile 103 to the second facsimile 116 is asymmetric in that most of the data flow occurs from the first facsimile 103 to the second facsimile 116. In the opposite direction, for example, short acknowledgement symbols are relayed from the second facsimile 116 to the first facsimile 103. In establishing the data communications, the first facsimile 103 and the second facsimile 116 negotiate a preferred data rate to be used for the fax transmission. Based upon this transmission rate, the first facsimile 103 sends an upstream fax transmission 126 to the first gateway 106 by way of the local loop 119. The upstream fax transmission 126 is sent using a modulation scheme such as pulse code modulation, for example, that provides an upstream data rate of greater than 33.6 kilobytes per second.

Given that the bulk of the data flow is in the upstream direction on the local loop 119, the pulse code modulation employed by the first facsimile 103 to transmit the data to the first gateway 106 is negotiated with prioritization in the upstream direction as will be discussed. The first gateway 106 then transmits the fax data received from the first facsimile 103 across the network 109 in a network fax transmission 129 according to the protocol employed by the network 109. Once the second gateway 113 receives the fax data from the network 109, the second gateway 113 modulates the data in a downstream fax transmission 133 that is sent across the local loop 123 to the second facsimile 116. The second gateway 113 generally employs the same modulation scheme in transmitting the fax data to the second facsimile 116 in the form of a downstream fax transmission 133. Note however, that with regard to the second gateway 113 and the second facsimile 116, the downstream fax transmission 133 is prioritized in the downstream direction so as to provide a data rate of greater than 33.6 kilobytes per second.

Given that the fax data transmission from the first facsimile 103 to the second facsimile 116 is asymmetric with the bulk of the data flowing from the first facsimile 103 to the second facsimile 116, the amount of data that flows from the second facsimile 116 back to the first facsimile 103 is minimal. This data may encompass, for example, acknowledgement information and other data control and management information. To facilitate the flow of data from the second facsimile 116 to the first facsimile 103, a reverse upstream fax transmission 136 is transmitted to the second gateway 113 at a much lower bit rate than the downstream fax transmission 133 given the prioritization in the downstream direction. The reverse upstream fax transmission 136 includes a much lower power level than the downstream fax transmission 133 that makes it much more susceptible to noise, etc. Thus, the reverse upstream fax transmission 136 is sent at a slower bit rate to insure that it is received without error by the second gateway 113 over the local loop 123.

The second gateway 113 then demodulates the reverse upstream fax transmission 136 and generates a reverse network transmission 139 that is transmitted to the first gateway 106 using the protocol of the network 109. The first gateway 106 then modulates the fax data from the second facsimile 116 and transmits a reverse downstream fax transmission 143 to the first facsimile 103 over the local loop 119. The reverse downstream fax transmission 143 is sent at a lower power level and lower bit rate than the upstream fax transmission 126 as communication on the local loop 119 is prioritized in the upstream direction. The first facsimile 103 thus receives an acknowledgement for the pages it has transmitted to the second facsimile 116 accordingly.

With reference to FIG. 2, shown is a functional block diagram, for example, of the first facsimile 103 along with a hybrid transformer 153 that links the first facsimile 103 to the local loop 119. The first facsimile 103 includes facsimile operation 156, a transmitter 159, a receiver 163, and an echo canceler 166. The block diagram of the first facsimile 103 illustrates a general operation thereof. Specifically, the facsimile hardware 156 represents, for example, the scanning, storing, printing and other operational functionality of the first facsimile 103. The facsimile hardware 156 by virtue of its scanning and storing functions generates a stream of data bits that represent the image of the scanned document. This data is applied to the transmitter 159 to transmit to the second facsimile 116 as discussed with reference to FIG. 1. The output of the transmitter 159 is the upstream fax transmission 126 that is applied to the hybrid transformer 153 as shown as well as to the echo canceler 116. The upstream fax transmission 126 as applied to the echo canceler 166 is delayed by a certain time period as will be discussed.

Upon reaching the hybrid transformer 153, the upstream fax transmission 126 is then transmitted to the first gateway 106 by virtue of the local loop 119. At the same time, the upstream fax transmission 126 is reflected back to the echo canceler 166 along with a received downstream transmission 143 that originated from the second facsimile 116. The reflection of the upstream fax signal 126 back to the echo canceler 166 as shown along with the downstream transmission 143 is a byproduct of impedance mismatching in the hybrid transformer 153 as is known by those with ordinary skill in the art. The echo canceler 166 then subtracts the upstream fax transmission 126 that has been delayed by a certain amount from the received signal from the hybrid transformer 153. This subtraction results in the downstream fax transmission 143 where the reflected upstream fax transmission 126 is cancelled by the same signal that is applied directly to the echo canceler 166. The downstream transmission 143 has been applied to the receiver 163 and is demodulated and thereafter applied to the facsimile hardware 156 in connection with the general operation of the first facsimile 103.

As was mentioned previously, the transmitter 159 employs a method of modulation that includes a higher power level and a higher bit rate than the downstream transmission 143. Specifically, the upstream fax transmission 126 may use, for example, a pulse code modulation or other modulation scheme that provides a much higher bit rate as is desired to transmit the facsimile at a faster rate. The higher bit rate and power level of the upstream fax transmission 126 illustrates a prioritization for that signal over the downstream transmission 143. This prioritization is negotiated between the first facsimile 103 and the first gateway 116 during startup activity between the two devices.

With reference to FIG. 3, shown is a block diagram of an example of the first facsimile 103 according to another embodiment of the present invention. The first facsimile 103 depicted in FIG. 3 shows a software implementation of the first facsimile that includes various general-purpose hardware components and software components according to this embodiment of the present invention. It is understood, however, that the software components as shown may be implemented in terms of dedicated hardware or a combination of software/general purpose hardware and dedicated hardware.

According to the embodiment shown in FIG. 3, the first facsimile 103 includes, for example, a processor 203 and a memory 206, both of which are coupled to a local interface 209. The local interface 209 may comprise, for example, a data bus with an associated control bus as is known by those of ordinary skill in the art. Stored on the memory 206 is fax control logic 213 and documents 216 in digital form. The facsimile 103 also includes, for example, a scanner interface 219 and other input/output interfaces 223 as shown. The scanner interface 219 links the local interface 209 to various scanning hardware that is included within the first facsimile 103, but not shown in FIG. 3. Specifically, such equipment may include, for example, appropriate lights, sensors, and logical circuitry to obtain a digital representation of a document to store in the memory as the documents 216. The I/O interfaces 223 electrically couple any input/output devices of the first facsimile 103 to the local interface 209 such as user input devices and output devices. The user and input devices may comprise, for example, touch screens, push buttons, or other such devices. The output devices may comprise, for example, screens, lights, speakers, or printers as well as other appropriate output devices. The fax control logic 213 is employed to control the overall functionality of the facsimile 103 and is not discussed herein in detail.

The first facsimile 103 also includes, for example, a modem 243 that provides a means by which the first facsimile 103 can communicate with the first gateway 106 by way of the local loop 119. The modem 243 features, for example, a digital signal processor 246 that includes a DSP processor 249 and a DSP memory 253. The DSP processor 249 and the DSP memory 253 are both coupled to a local interface 256. The local interface 256 may comprise, for example, a data bus with an associated control bus as is known by those of ordinary skill in the art. The DSP 246 also includes a data terminal device interface 259 that links the local interface 209 with the local interface 256. The data terminal device interface 259 thus includes, for example, appropriate buffering circuitry and/or other circuitry that allows the processor 203 to communicate with the DSP processor 249 appropriately.

The DSP 246 also includes, for example, a local loop interface 263 that links the local interface 256 with a hybrid transformer 153 to allow the DSP 246 to communicate to the first gateway 106 by way of the local loop 119. The local loop interface 263 incorporates appropriate digital and analog circuitry to allow the creation of the upstream fax transmission 126 using the appropriate data modulation. For example, the local loop interface 263 may employ a digital-to-analog converter to transform digital data from the local interface 256 into the analog signal that is the upstream fax transmission 126 sent to the first gateway 106 across the local loop 119. Also, the local loop interface 263 may include an analog-to-digital converter to generate a digital representation of a signal received from the hybrid transformer 153 and the local loop 119. The local loop interface 263 further includes, for example, appropriate buffer circuitry to make the signal available on the local loop 256 in digital form.

Stored on the DSP memory 253, for example, is fax transmit logic 159, fax receive logic 163, and echo canceler logic 166. The fax transmit logic 159, fax receive logic 163, and echo canceler logic 166 are stored in the DSP memory 253 and are executable by the DSP processor 249 to perform various functions of the modem 243. Specifically, the fax transmit logic 159 is executed by the DSP processor 249 to obtain the fax data from the local interface 209 through the data terminal device interface 259 and to perform all necessary processing and apply the output data to the local interface 263 for transmission on the local loop 119. The fax receive logic 163 is executed by the DSP processor 249 to obtain the received data signal from the local loop interface 263 and to demodulate the fax data contained therein. The fax receive logic 163 also applies the fax data to the data terminal interface 259 where it may be accessed by the processor 203 and ultimately printed out by the printing function of the first facsimile 103. Finally, the echo canceler 166 is executed by the DSP processor 249 to perform the functions of the echo canceler 166 as described with reference to FIG. 2.

In addition, the processors 203, 249 and memories 206, 253 may represent multiple processors and memories that operate in parallel. In such a case, the local interfaces 209, 256 may be an appropriate network that facilitates communication between any two of the multiple processors or between any processor and any of the memories, etc. In addition, the processors 203, 249; the memories 206, 253; and the local interfaces 209, 256 may include electrical or optical circuitry, or a combination of electrical and optical circuitry.

The memories 206, 253 include both volatile and nonvolatile memory components. Volatile components are those that do not retain data values upon loss of power. Conversely, nonvolatile components retain data upon a loss of power. Thus, the memories 206, 253 may comprise, for example, random access memory (RAM), read-only memory (ROM), hard disk drives, floppy disk drives, compact disk drives, tape drives, and/or other memory components, or a combination of any two or more of these memory components.

Figure 4:
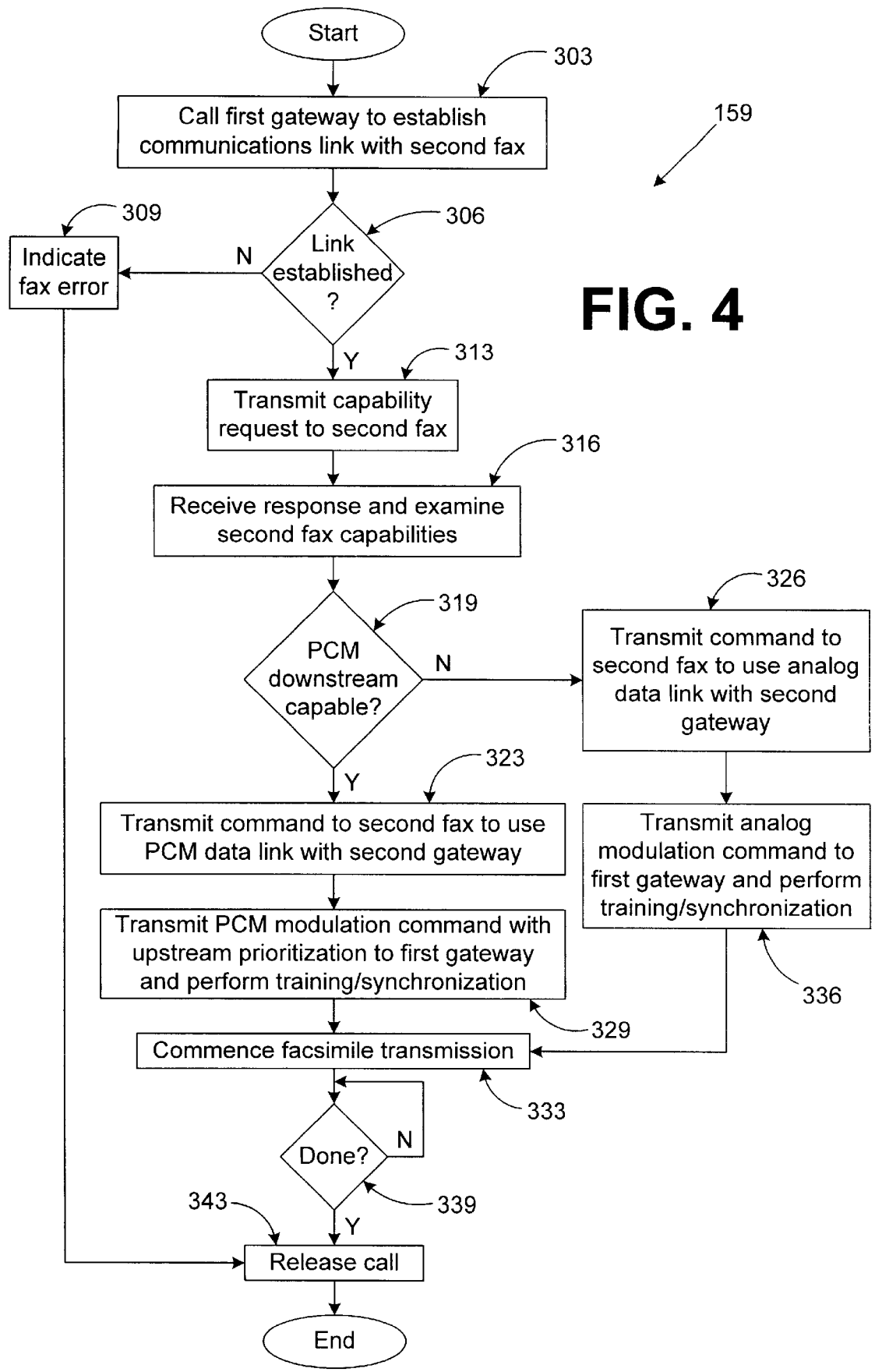
FIG. 4 is a flow chart of fax transmit logic executed by the first facsimile of FIG. 4.

Turning to FIG. 4, shown is a flowchart that provides an example of the fax transmit logic 159 according to an embodiment of the present invention. Alternatively, the flow chart of FIG. 4 may be viewed as a method implemented in the digital signal processor 246. The fax transmit logic 159 is executed by the DSP processor 249, for example, to transmit a document to the second facsimile 116. Beginning with block 303, the fax transmit logic 159 calls the first gateway 106 to establish a communications link with the second facsimile 116. As discussed previously, the first gateway 106 then communicates with the second gateway 113 that in turn establishes contact with the second facsimile 116. In block 306, the fax transmit logic 159 determines if the link cannot be established for some reason, such as, for example, when the second facsimile 116 is unavailable. If such is the case, then the fax transmit logic 159 moves to block 309 in which a fax error is generated and printed to indicate to the user that a particular facsimile did not go through.

On the other hand, if it is determined that the communications link is established with the second facsimile 116 in block 306, the fax transmit logic 159 moves to block 313 in which the first facsimile 103 transmits a capability request to the second facsimile 116. The second facsimile 116 responds to the capability request with a message indicating its capabilities in terms of modulation types, transmission speed, etc. Thereafter, in block 316 the response from the second facsimile 116 is received and examined to determine its transmission capabilities. The functions of blocks 303 through 316 roughly correlate to similar steps described, for example, in ITU-T Recommendation T.30, "Procedures for document facsimile transmission in the general switched telephone network", Series T: Terminal Equipments and Protocols for Telematic Services, Jul. 1996 promulgated by the International Telecommunication Union (ITU), the entire text of which is incorporated herein by reference.

In block 319, if the second facsimile 116 is capable of pulse code modulation with prioritization in the downstream direction for the downstream fax transmission 133 as set forth, for example, in ITU-T Recommendation V.90, dated May 6, 1998 promulgated by the ITU, the entire text of which is incorporated by reference. Alternatively, the downstream modulation may be any type of modulation that provides for a bit rate of greater than 33.6 kilobits per second, including digital subscriber line modulation types, etc. If the fax transmit logic 159 determines in block 319 that the second facsimile 116 is capable of pulse code modulation with prioritization in the downstream direction or other modulation in the downstream direction with a bit rate of greater than 33.6 kilobits per second, then the fax transmit logic 159 progresses to block 323. Otherwise, the fax transmit logic 159 moves to block 326.

In block 323, the fax transmit logic 159 transmits a command to the second facsimile to employ pulse code modulation with prioritization in the downstream direction for the downstream fax transmission 133. Thereafter, in block 329 a command is transmitted to the first gateway 106 that specifies that pulse code modulation is to be employed in communicating with the first facsimile 103. Also, the fax transmit logic 159 performs training and synchronization tasks with the first gateway 106 to establish the pulse code modulation with prioritization in the upstream direction for the upstream fax signal 126. This advantageously provides for a higher speed of data transfer of greater than 33.6 kilobits per second from the first facsimile 103 to the first gateway 106. Likewise, the same high speed is employed from the second gateway 113 to the second facsimile 116, thereby reducing the time it takes to transmit a document via facsimile. This is true given that the time it takes to transfer data across the network 109 is generally faster than across the local loops 119 and 123. Thereafter, in block 333, with the virtual communications link established from the first facsimile 103 to the second facsimile 116, the document is transmitted accordingly.

Referring back to block 319, assuming that the second facsimile 116 is not capable of implementing pulse code modulation prioritized in the downstream direction or other modulation approach that provides downstream capability at greater than 33.6 kilobits per second, the fax transmit logic 159 moves to block 326. In block 326 a command is transmitted to the second facsimile 116 to employ an appropriate analog data link with the second gateway 113 such as that set forth in ITU Recommendation V.34 promulgated by the ITU. Thereafter, in block 336 the fax transmit logic 159 transmits an analog modulation command to the first gateway 106 to set up the same modulation scheme for the upstream fax transmission 126. Then, the fax transmit logic 159 proceeds to block 333.

From block 333, the fax transmit logic 159 progresses to block 339 where it waits until the fax transmission is complete. This may be determined, for example, by receiving a predefined signal from the processor 203 that indicates that the transmission of the particular document is finished. If in block 339 the fax transmission is complete, the fax transmit logic 159 progresses to block 343 in which the call to the first gateway 106 is released. Thereafter, the fax transmit logic 159 ends.

Figure 5:
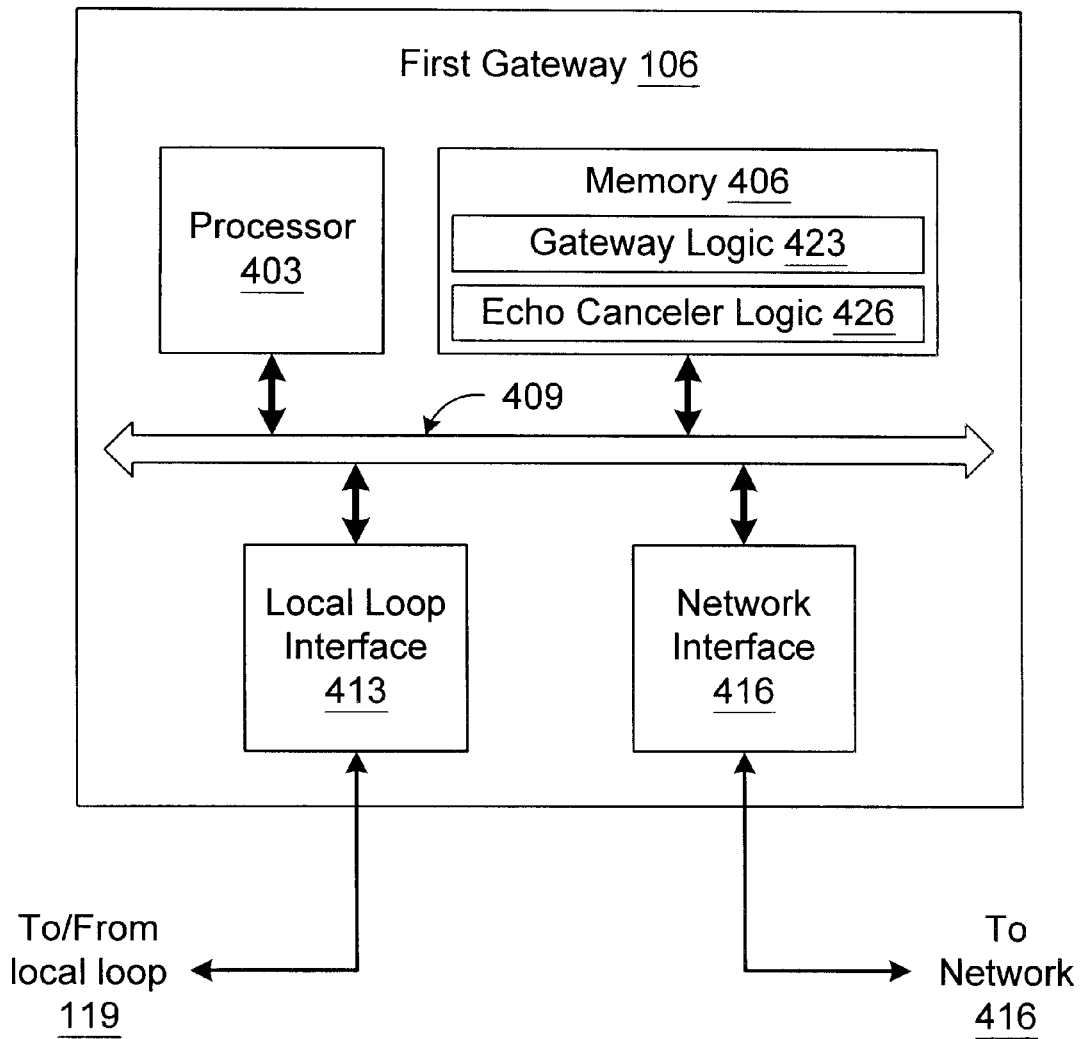
FIG. 5 is a block diagram of a gateway according to another aspect of the present invention.

Referring next to FIG. 5, shown is a block diagram that provides an example of the first gateway 106 according to another aspect of the present invention. In a similar manner to the first facsimile 103, the first gateway 106 as depicted in FIG. 5 illustrates a software implementation using general-purpose hardware including a processor circuit. Alternatively, the first gateway 106 may be implemented in terms of dedicated hardware or as a combination of software/general purpose hardware and dedicated hardware.

With regard to the exemplary embodiment as shown with reference to FIG. 5, the first gateway 106 includes, for example, a processor circuit with a processor 403 and a memory 406, both of which are coupled to a local interface 409. The local interface 409 may be, for example, a data bus with an accompanying control bus as known by those with ordinary skill in the art. Alternatively, the processor 403 and memory 406 may represent multiple processors and memories that operate in parallel. In such a case, the local interface 409 may be, for example, an appropriate network that facilitates communication between any two of the multiple processors or between any processor and any of the memories, etc. In addition, the processor 403, the memory 406, and the local interface 409 may include, for example, electrical or optical circuitry, or a combination of electrical and optical circuitry.

Also, the memory 406 includes, for example, both volatile and nonvolatile memory components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disk drives, compact disk drives, tape drives, and/or other memory components, or a combination of any two or more of these memory components.

The first gateway 106 includes a local loop interface 413 and a network interface 416. The local loop interface 413 couples the local loop 119 to the local interface 409. Likewise, the network interface 416 couples the network 109 to the local interface 409. The local loop interface 413 and the network interface 416 include, for example, appropriate buffer circuitry as well as circuits to transmit and receive the facsimile data to and from the local loop 119 and the network 109.

The first gateway 106 also includes gateway logic 423 and echo canceler logic 426. The gateway logic 423 is executable by the processor 403 to perform the translation functions of the first gateway 106. These translation functions include, for example, demodulating the upstream fax transmission 126, packaging the demodulated fax data according to the network protocol, and transmitting the fax data to the second gateway 113 via the network 109. The echo canceler logic 426 is executable by the processor 403 to cancel an echo that occurs from the transmission on the local loop 119 to the first facsimile 103 in a similar manner to the echo canceler logic 166.

Figure 6:
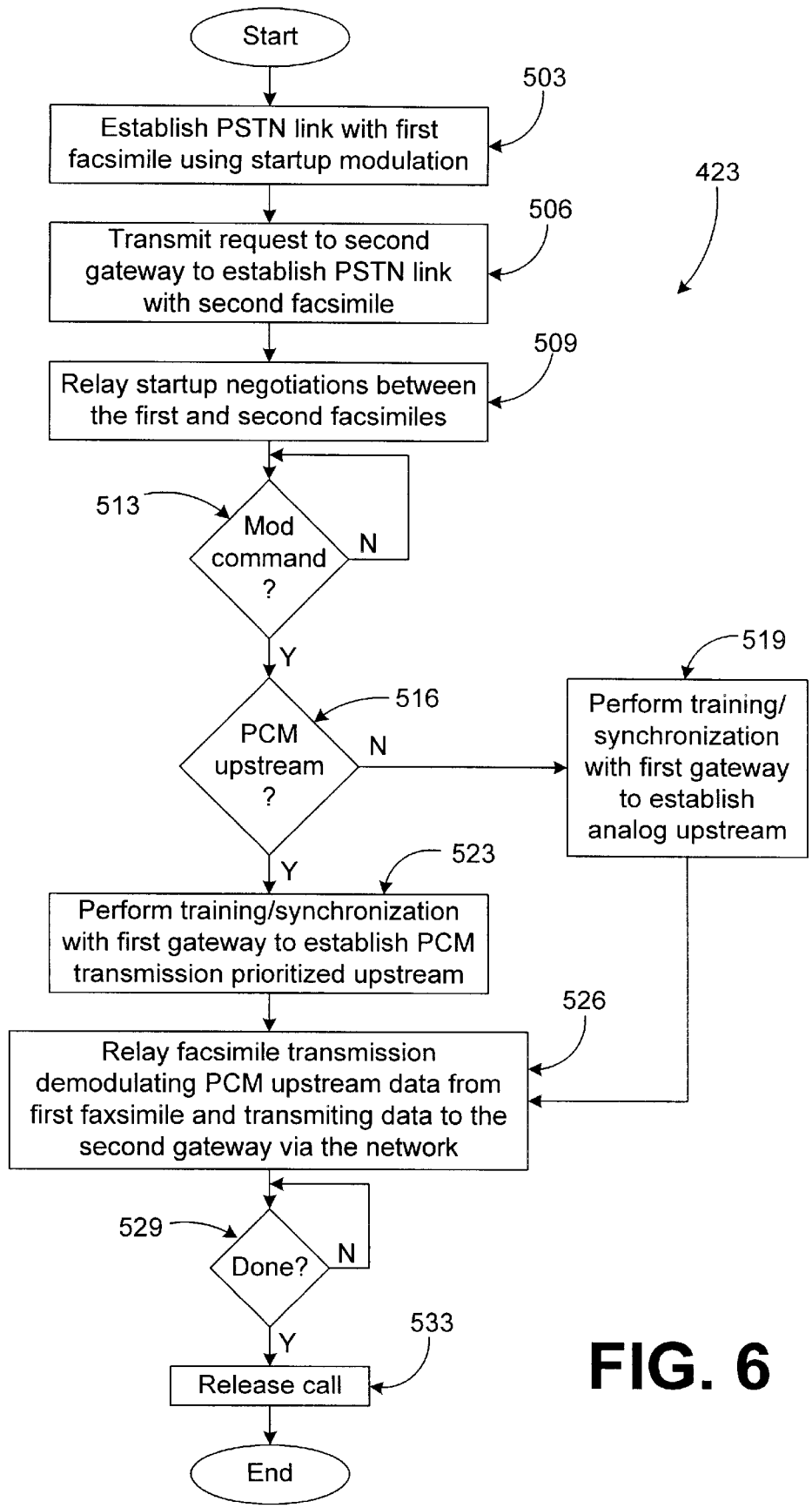
FIG. 6 is a flow chart of gateway logic executed by the gateway of FIG. 5.

Referring to FIG. 6, shown is a flow chart of the gateway logic 423 according to another aspect of the present invention. Alternatively, the flow chart of FIG. 6 may be viewed as a method implemented in the first gateway 106. Beginning with block 503, the gateway logic 423 establishes a communications link with the first facsimile 103 through the local loop 119 using a robust, low speed startup protocol, for example, as known by those of ordinary skill in the art. Next, in block 506 the gateway logic 423 transmits a request to the second gateway 113 to establish a communications link with the second facsimile 116. Thereafter, the gateway logic 423 relays startup negotiations between the first and second facsimiles 103 and 116. An illustration of the functionality of blocks 503, 506, and 509 is provided, for example, in ITU-T Recommendation T.38, "Procedures for real-time Group 3 facsimile communication over IP networks", *Series T: Terminals for Telematic Services*, Jun. 1998, which is incorporated herein by reference in its entirety.

The gateway logic 423 then proceeds to block 513 in where it waits for a modulation command from the first facsimile 103 that informs the first gateway 106 the modulation type that is to be employed in communicating with the first facsimile 103 across the local loop 119. In block 516 it is determined whether the modulation type to be employed is pulse code modulation, for example, with prioritization in the upstream direction, thereby providing a data rate of greater than 33.6 kilobits per second. Alternatively, the modulation type may also be another type that provides such a data rate. If in block 516, the first facsimile 103 does not indicate that pulse code modulation or its equivalent with the desired bit rate greater than 33.6 kilobits per second is to be used, the gateway logic 423 moves to block 519. Otherwise the gateway logic 423 progresses to block 523.

Assuming for the moment that the gateway logic 423 has progressed to block 523, the gateway logic 423 performs training and synchronization functions with the first facsimile 103 to establish pulse code modulation transmission with prioritization in the upstream direction for the upstream fax transmission 126. Thereafter, the gateway logic 423 proceeds to block 526 in which the fax data is relayed from the local loop onto the network and vice versa. Next, the gateway logic 423 moves to block 529.

Referring back to block 519, since the modulation type is not to be pulse code modulation or its equivalent in speed, the gateway logic 423 implements an appropriate analog data transmission for the upstream fax transmission 126. Such analog data transmission may be implemented, for example, using V.34 or lower standard as set forth by the ITU as is generally known by those with ordinary skill in the art.

In block 529, the gateway logic 423 waits until the transmission of the fax data is complete. Then, in block 533, the call is released as the transmission has ended. Thereafter, the gateway logic 423 ends accordingly, to wait for the next call.

With reference to FIGS. 3, 4, 5, and 6, although the logic 159, 163, 166, 423, and 426 of the present invention is embodied in software as discussed above, as an alternative it may also be embodied in hardware or a combination of software and hardware. If embodied in hardware, the logic 159, 163, 166, 423, and 426 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and/or flow charts of FIGS. 3, 4, 5, and 6 show the architecture, functionality, and operation of an implementation of the logic 159, 163, 166, 423, and 426. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow charts of FIGS. 4 and 6 show a specific order of execution, it is understood that the order of execution may differ from that which is depicted. For example, the order of execution of two or more blocks may be scrambled relative to the order shown. Also, two or more blocks shown in succession in FIGS. 4 and 6 may be executed concurrently or with partial concurrence. It is understood that all such variations are within the scope of the present invention.

In addition, the logic 159, 163, 166, 423, and 426 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the logic 159, 163, 166, 423, and 426 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory By (ROM), an erasable programmable read-only memory, or a portable compact disc read-only memory (CDROM).

Many variations and modifications may be made to the above-described embodiment(s) of the invention without departing substantially from the spirit and principles of the invention. All such modifications and variations are intended to be included herein within the scope of the present invention.

What is claimed is:

1. A data communications system in a facsimile machine, comprising:

a processor coupled to a local interface;

a memory coupled to the local interface; and data communications logic stored on the memory and executable by the processor, the data communications logic comprising:

logic to initiate a virtual data communications link with a peer facsimile machine through a first public switched telephone network (PSTN) link, a first gateway, a network, a second gateway, and a second PSTN link;

logic to negotiate a data rate with the peer facsimile including logic to determine whether the peer facsimile supports a pulse code modulation (PCM) communications mode;

logic to transmit a command to the second gateway to employ the PCM communications mode in a downstream direction with the peer facsimile if the peer facsimile supports the PCM communications mode; and logic to transmit an upstream data signal in the first PSTN link using a pulse code modulation if the peer facsimile supports the PCM communications mode.

2. The system of claim 1, wherein the logic to transmit the upstream data signal in the first PSTN link using the pulse code modulation further comprises logic to establish the upstream data signal concurrently with a downstream data signal, wherein the upstream data signal is prioritized over the downstream data signal.

3. The system of claim 1, wherein the data communications logic further comprises logic to cancel an echo of the upstream data signal.

4. The system of claim 1, wherein the logic to transmit the upstream data signal in the first PSTN link using the pulse code modulation further comprises logic to establish a data rate of the upstream data signal greater than 33.6 Kilobits/sec.

5. The system of claim 1, wherein the data communication logic further comprises logic to establish the first PSTN link using an analog modulation in lieu of the pulse code modulation.

6. The system of claim 2, wherein the logic to establish the upstream data signal concurrently with a downstream data signal, wherein the upstream data signal is prioritized over the downstream data signal further comprises logic to prioritize the upstream data signal by setting an upstream transmission power level sufficient to establish the upstream data signal at a first data rate of greater than 33.6 Kilobits/sec and by establishing a downstream data signal with a downstream transmission power level that is less than the upstream transmission power level and with a second data rate that is less than the first data rate.

7. A data communications system in a facsimile machine, comprising:
means for initiating a virtual data communications link with a peer facsimile machine through a first public switched telephone network (PSTN) link, a first gateway, a network, a second gateway, and a second PSTN link;
means for negotiating a data rate with the peer facsimile including means for determining whether the peer facsimile supports a pulse code modulation (PCM) communications mode;
means for transmitting a command to the second gateway to employ the PCM communications mode in a downstream direction with the peer facsimile if the peer facsimile supports the PCM communications mode; and
means for transmitting an upstream data signal in the first PSTN link using a pulse code modulation if the peer facsimile supports the PCM communications mode.

8. The system of claim 7, wherein the means for transmitting the upstream data signal in the first PSTN link using the pulse code modulation further comprises means for establishing the upstream data signal concurrently with a downstream data signal, wherein the upstream data signal is prioritized over the downstream data signal.

9. The system of claim 7, further comprising means for canceling an echo of the upstream data signal.

10. The system of claim 7, wherein the means for transmitting the upstream data signal in the first PSTN link using the pulse code modulation further comprises means for establishing a data rate of the upstream data signal greater than 33.6 Kilobits/sec.

11. The system of claim 7, further comprising means for establishing the first PSTN link using an analog modulation in lieu of the pulse code modulation.

12. The system of claim 8, wherein the means for establishing the upstream data signal concurrently with a downstream data signal, wherein the upstream data signal is prioritized over the downstream data signal further comprises means for prioritizing the upstream data signal by setting an upstream transmission power level sufficient to establish the upstream data signal at a first data rate of greater than 33.6 Kilobits/sec and by establishing a downstream data signal with a downstream transmission power level that is less than the upstream transmission power level and with a second data rate that is less than the first data rate.

13. A method for data communications in a facsimile machine, comprising the steps of:
initiating a virtual data communications link with a peer facsimile machine through a first public switched telephone network (PSTN) link, a first gateway, a network, a second gateway, and a second PSTN link;
negotiating a data rate with the peer facsimile including determining whether the peer facsimile supports a pulse code modulation (PCM) communications mode;
transmitting a command to the second gateway to employ the PCM communications mode in a downstream direction with the peer facsimile if the peer facsimile supports the PCM communications mode; and
transmitting an upstream data signal in the first PSTN link using a pulse code modulation if the peer facsimile supports the PCM communications mode.

14. The method of claim 13, wherein the step of transmitting the upstream data signal in the first PSTN link using the pulse code modulation further comprises the step of establishing the upstream data signal concurrently with a downstream data signal, wherein the upstream data signal is prioritized over the downstream data signal.

15. The method of claim 13, further comprising the step of canceling an echo of the upstream data signal.

16. The method of claim 13, wherein the step of transmitting the upstream data signal in the first PSTN link using the pulse code modulation further comprises the step of establishing a data rate of the upstream data signal greater than 33.6 Kilobits/sec.

17. The method of claim 13, further comprising the step of establishing the first PSTN link using an analog modulation in lieu of the pulse code modulation.

18. The method of claim 14, wherein the step of establishing the upstream data signal concurrently with a downstream data signal, wherein the upstream data signal is prioritized over the downstream data signal further comprises the steps of:
prioritizing the upstream data signal by setting an upstream transmission power level sufficient to establish the upstream data signal at a first data rate of greater than 33.6 Kilobits/sec; and
establishing a downstream data signal with a downstream transmission power level that is less than the upstream transmission power level and with a second data rate that is less than the first data rate.

\* \* \* \* \*